United States Patent [19]
Larsen

[11] 3,746,302
[45] July 17, 1973

[54] POWER DRIVE SEAL VALVE

[76] Inventor: James P. Larsen, 7026 E. Sunnyside Drive, Scottsdale, Ariz. 85254

[22] Filed: Sept. 9, 1971

[21] Appl. No.: 178,903

Related U.S. Application Data

[63] Continuation-in-part of Ser. No. 35,341, May 7, 1970, abandoned.

[52] U.S. Cl............ 251/103, 251/163, 251/188, 251/317, 251/116
[51] Int. Cl............................................. F16k 25/00
[58] Field of Search................ 251/102, 103, 104, 251/105, 106, 160, 161, 162, 163, 188, 116, 317

[56]           References Cited
          UNITED STATES PATENTS

| 1,985,449 | 12/1934 | Heggem | 251/163 |
| 3,365,168 | 1/1968 | Latham | 251/188 |
| 915,706 | 3/1909 | Shackleton | 251/116 |
| 1,803,773 | 5/1931 | Schmidt | 251/160 |
| 1,940,797 | 12/1933 | Halvorsen | 251/102 X |
| 893,847 | 7/1908 | Hopper | 251/116 |
| 3,430,658 | 3/1969 | Self | 251/163 |

FOREIGN PATENTS OR APPLICATIONS

1,103,068   5/1955   France................ 251/188

Primary Examiner—Harold W. Weakley
Attorney—Eric P. Schellin and John A. Robertson

[57]            ABSTRACT

A field-oriented valve which provides positive and complete sealing against high pressures with a minimum of physical effort. Built-in mechanical power assists facilitate a perfect seal and there is no contact of the soft seal with the valve body during opening or closing, and the valve uses line pressure to open rather than close.

15 Claims, 18 Drawing Figures

INVENTOR.
JAMES P. LARSEN

INVENTOR.
JAMES P. LARSEN
BY
Browdy and Neimark
attorneys

INVENTOR.
JAMES P. LARSEN

POWER DRIVE SEAL VALVE

CROSS-REFERENCE TO RELATED PATENTS

This application is a continuation-in-part of my present pending application entitled "Power Drive Seal Valve", filed May 7, 1970, Ser. No. 35,341 and now abandoned.

The present invention relates to valves and, more particularly, to valves for controlling high pressure wherein built-in mechanical power assists aid in opening and closing the valve with a minimum of energy.

Many field-oriented, heavy duty, high-pressure valves, as found in the prior art, are limited in their application because of inherent drawbacks and faulty operation. Probably the most outstanding defect of these valves is the manner in which they actually open and close to control the flow of liquid or gas passing through them. Since the fluid flow is under high pressure, the advance and withdrawal of any obstruction through this flow requires an abnormal amount of effort, and the higher the pressure the more the effort. Also, the majority of these prior art valves use the line pressure to hold the valve seal closed so that after long periods of inactivity, the valve is practically inoperable.

Since many valves utilize a threaded valve stem which advances the soft seal until it is forced against the valve body, there is always a great deal of wear on the soft seal as it rotates against the valve seat.

Frequently valves are designed with a plug having a relatively large mass, the plug to be tilted into the inside of the housing to effect a seal. In valve designs of this type, it is difficult to furnish bearings for the plug trunnions on the bottom and/or the trunnion or stem on the top, and under high pressure service, a valve without bearings will require considerable torque to operate. Also, as the valve cycles many times, the bottom trunnion will wear on the "downstream" side of the valve and once the trunnion has become worn, the tilting of the plug into the seat will have an imperfect "mating", resulting in early leakage. Furthermore, it appears that dirt and line products can settle in the trunnion area, and also in the seal area which may additionally render the valve hard to operate.

Another type valve used may employ a conical plug which is moved up and down to effect sealing and unsealing, but here again the moving up and down of a large plug mass makes for considerable friction-producing areas with the attendant difficulty in having bearings to reduce torque during the rotation phase of valve operation.

Still other valves have difficulty in compensating for thermal expansion and contraction of parts. Thus, when the packing annulus which may, for example, comprise molded tetrafluoroethylene is subjected to heating, it tends to swell relative to such confining structure, and upon cooling, it tends to shrink, making it difficult to maintain the desired degree of packing pressurization. The same problem is found to exist in those instances where the stopper structure in closed position moves within its tolerance or deflection limitations toward and away from the packing in response to variations in line pressure.

The present invention, in providing a simple and ingenious solution to the above difficulties, provides a field-oriented valve designed to eliminate many common problems encountered during heavy-duty conditions. It is unique in that it uses line pressure to open, rather than close, the valve. This is the reverse of valves in which the greater the line pressure, the more difficult it is to open the valve. Additionally, there is no contact of the soft seal with the valve body during opening and closing, thus eliminating a frequent source of wear.

The valve of the present invention operates on a valve "power drive seal" principle; this term is derived from the built-in mechanical power assists which facilitate a perfect seal with a minimum of energy. A unique utilization of line pressure plus mechanical back-up causes the seal to disengage, creating an unusually easy opening valve.

During the closing cycle, while the plug is rotating, the seal is retracted into the plug and out of contact with the sealing surface. Then, after the plug has rotated 90° into a "closed" position, an automatic disengaging of the stem and plug occurs. Now, with the plug locked into its "closed" position, continued torque on the stem causes the seal to move out of its nesting within the blind side of the plug and into contact with the sealing surface of the valve body. This is accomplished by a plurality of camming balls rolling out of their seats and generating substantial mechanical advantage, greatly reducing the torque required at the stem to secure a positive, bullet-tight seal.

Opening the valve utilizes line pressure primarily to retract the seal into its nest within the blind side of the plug before any rotation of the plug. An automatic mechanical assist assures this function, however, in the event line pressure is absent. During the opening cycle, as the initial engagement of stem and the plug occurs, cam means interracting between the body structure and the seal retract the seal into the plug away from the body structure, thus preventing contact of the soft seal with the valve body during rotation of the plug therewithin.

It is, accordingly, an object of the present invention to overcome the defects of the prior art, such as indicated above.

Another object of the present invention is the provision of a valve which offers positive and complete sealing against high pressures with a minimum of physical effort.

Another object of the invention is the provision of improved high-pressure sealing with reduced valve wear.

Another object of the present invention is the provision of a valve which eliminates friction and wear on the seal during rotation of the valve plug.

Still another object of the present invention is the provision of a valve with full and automatic metal-to-metal backup of the soft seal, in the event of fire and/or disintegration of the soft seal.

Yet another object of the present invention is the provision of a valve with a self-releasing feature for the seal which eliminates sticking and related problems of valve operation after extended use in either the open or closed position.

A further object of the invention is the provision of a valve that can seal on one or both sides of the plug, against flow in either direction.

Yet another object of the invention is the provision of a valve which is equally efficient for liquids and gases.

Still another object of the invention is the provision of a valve which has easy, positive operation in less than 180° of stem rotation, making it possible for the opening and closing of the valve to be automated, permitting remote control or power actuation.

Another object of the present invention is the provision of a valve in which the trunnion and/or bearing surfaces are sealed from line product contamination.

Another object of the present invention is the provision of a valve having a built-in temperature compensator which has a function of preventing damage to the soft seal due to overtorqueing.

These and other objects and advantages of the invention, as well as the details of an illustrative embodiment, will be more fully understood from the following detailed description of the drawings, in which.

Figure 1:
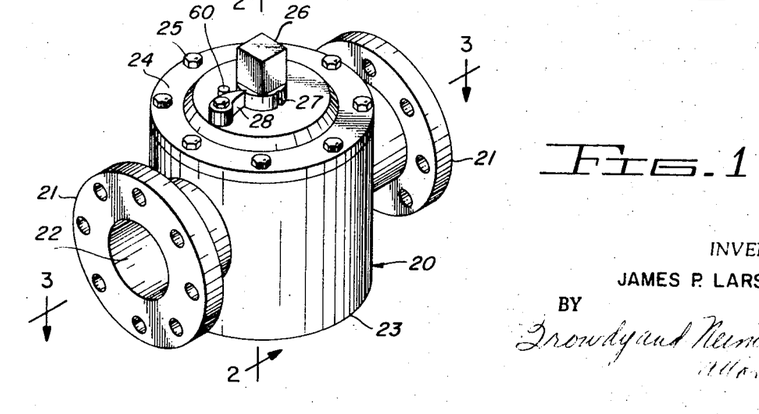
FIG. 1 shows an over-all view of the valve.

Referring now to the drawings, the valve assembly generally indicated at 20 in FIG. 1 includes a pair of flanged body caps 21 symmetrically connected into opposite ends of a lateral bore 22 formed through a body annulus 23. A cover plate 24 is held in place by a plurality of bolts 25 threaded into body annulus 23 while a valve stem 26 extends through a hole in the cover plate 24 and transversely across the body annulus 23 and across the lateral bore 22 as will be described more fully hereinafter. In the embodiment shown in FIG. 1, the valve stem 26 has a series of slots 27 around its circumference, or a toothed sprocket, and a ratchet 28 to mate with the slots 27 for holding the valve stem 26 from turning.

Figure 2:
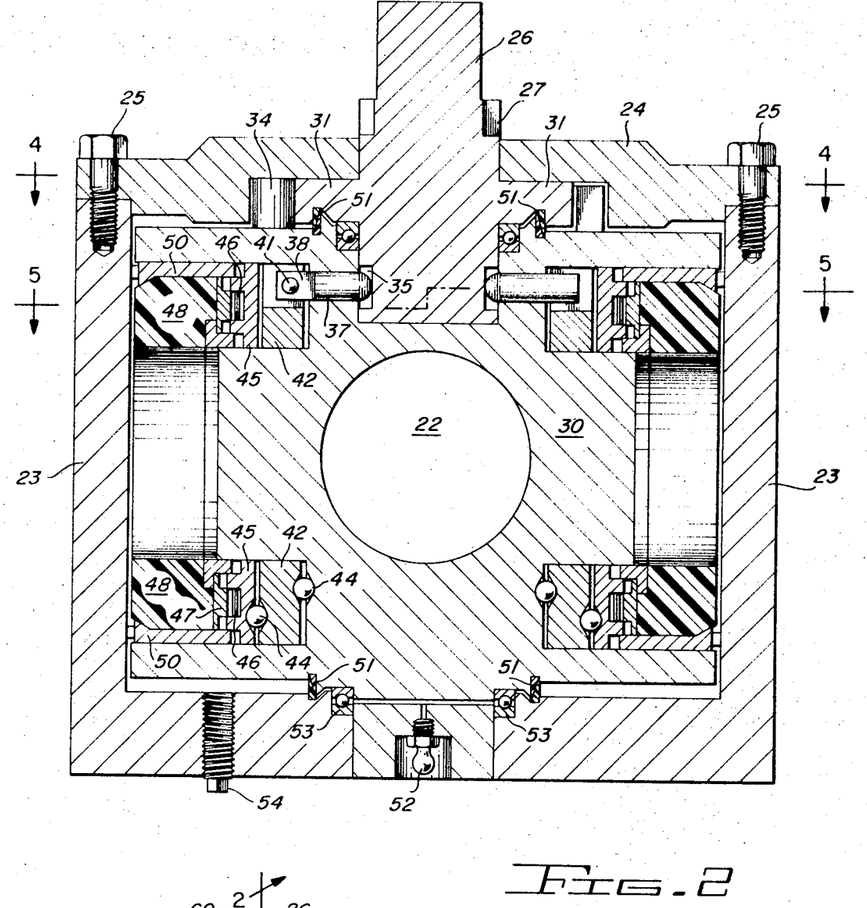
FIG. 2 shows a sectional view taken along the line 2—2 of FIG. 1.
Figure 3:
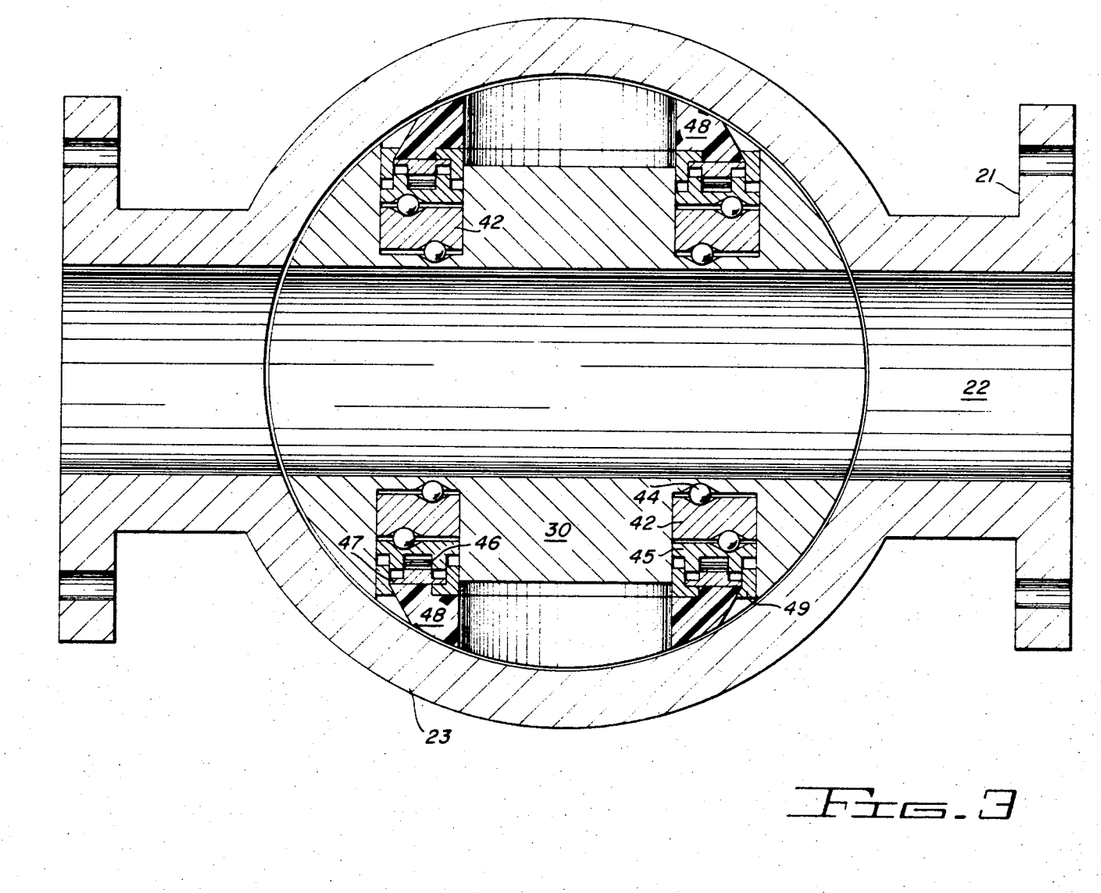
FIG. 3 shows a sectional view taken along the line 3—3 of FIG. 1.

A study of FIG. 2, which is a vertical sectional view along line 2—2 of FIG. 1 through the center of the valve 20, will reveal that the valve stem 26 is relatively short in length and is not integrally connected to the valve plug 30, as is usually the case. About midway the length of the stem, and forming an integral part thereof, there is a circular shoulder 31 extending transversely of the longitudinal axis of the stem, and at one side of the shoulder there is an arcuate, projecting lug 32 (see FIGS. 4, 6 and 8). Diametrically opposite lug 32 there is an indentation 33 in which rides an interlocking roller 34.

At the lower end of the valve stem there is cut an arcuate groove 35 which is cut deeper at one end than the other so as to form an inclined plane, and should the valve be a double block and bleed model, there may be two such planes, one on each side of the stem. This groove forms part of the sealing mechanism, as will be described more fully hereinafter.

Since rotation of plug 30 is limited to 90° and since continued rotation of the stem 26 (perhaps an additional 75°) is needed to actuate the sealing assembly, it is apparent that what is needed is a system to engage the stem and plug for 90°, but there have them automatically disengage so the plug stays at a 90° closed position, but the stem continues to turn. This is done with the interlocking roller 34 and a protruding ring 36 (FIGS. 4, 6 and 8) which is cast on top of the plug 30 and takes the form of a slightly raised, semi-circular ring which extends about three quarters, or about 270°, around the top of and integral with the plug 30.

The sealing function is accomplished, in part, by an actuating plunger 37 which is cylindrical in shape and rounded on one end so as to ride up the inclined plane formed by groove 35 in the lower end of the stem. The other end of the plunger has a flat side 38 which has a drill point or shallow indentation 40 in it, within which rides a camming ball 41. An annular camming plate 42 having a horizontal axis is provided with a gap into which the flat end of the plunger 37 fits. Movement of the plunger 37 moves the camming ball 41 out of drill point 40 to move slightly the camming plate 42 about its axis. Camming plate 42 also has drill points 43 on both its sides (FIG. 11) and camming balls 44 in these drill points, so that as it rotates the balls 44 move out of their drill points 43 and this results in a small, but greatly stepped-up mechanical advantage being imported to an annular power seal driver 45, which is U-shaped in cross-sectional configuration.

Positioned between the legs of the U of the driver 45 are waffle springs 46 to maintain a constant strain on the seal. Also riding between the legs of the U-shaped driver 45, and in contact with thw waffle springs 46, there is a T-shaped annular sealing piston 47, with the long part of the T between the legs of the driver 45, and the broad head of the T in contact with a soft annular seal 48 which, in operative position, surrounds the lateral bore 22 in the valve plug 30. The ramming of the soft seal 48 against the body of the valve 23 creates the actual seal. Also activated by the U-shaped power seal driver 45 is an annular nodular iron seal 50; the nodular iron being softer than steel, it provides metal-to-metal positive back-up sealing in the event of fire or a melting of the soft seal 48.

Oppositely planned, triangular-shaped seals 51 provide pressure seals between movable parts of the valve, while on its underside there is a pressure fitting 52 to provide lubrication for trunnion bearings 53. A bottom drain plug is shown at 54.

From the above it is apparent that the valve 20 of FIG. 1 is a trunnion-mounted plug valve, with one or two seals and a bottom drain plug and features postive sealing with metal-to-metal sealing back-up making it fire safe. Its operation will now be more fully explained.

Figure 12:
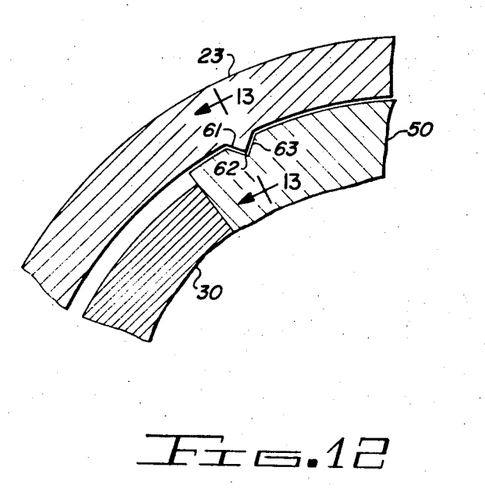
FIG. 12 is a sectional view taken along the line 12—12 of FIG. 10.
Figure 13:
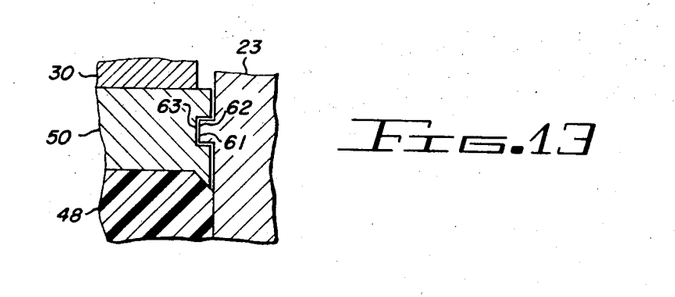
FIG. 13 is a sectional view taken along the line 13—13 of FIG. 12.
Figure 14:
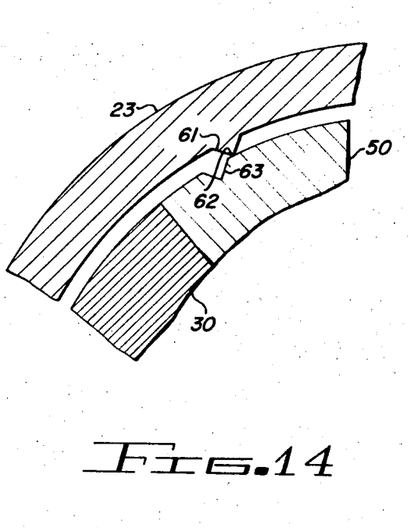
FIG. 14 is a fragmentary view corresponding to the view of FIG. 12 as the plug begins to rotate.

The seals are driven mechanically by rotation of the valve stem 26. Then the seal is locked in that sealed position by the ratchet 28 on the stem 26 which acts as a hand brake. The pin 60 is positionally removably retained within a corresponding recess within the cover plate 24 and is therefore removable to release the ratchet 28 and thereby unlock the stem 26. Line pressure, however, does cause the seal assembly to retract back into its recess in the blind side of the plug 30 for unsealing. That is, if the valve is in the open position, the seals 48 and 50 are retracted into the plug. In the absence of line pressure, a cam means interacting between the seal assembly and the body structure provides an automatic assist to assure this function. As viewed in FIGS. 12 and 13, a wedge-shaped cam 61 is carried by the interior walls of the body structure 23. The wedge 61 has an apex 62 extending radially inward from the body structure 23. A corresponding wedge-shaped indentation 63 is carried within the face of the soft seal 50. The wedge 60 is capable of nesting within the indentation 63 to permit the soft seal 50 to abut the interior wall of the body structure 23.

In closing the valve, the seals remain retracted for the first 90° of rotation of the stem 26 and plug 30, but then with the port of the plug in the closed position and with continued turning of the stem 26 (not plug 30), mechanical camming action forces the seat/seal assembly into contact with the inside of the valve body 23. During the continued turning of the stem as above described, there is no interaction between the cam 61 and the indentation 63. However, after engagement of the stem 26 with the plug 30, and at the initial movement of the plug, the seal assembly is immediately cammed away from the body structure 23 to retreat back into its recess within the plug 30. While the plug 30 turns its 90° of rotation (either opening or closing cycle), the seals 48 and 50 therefore are not scraping on the inside diameter of the valve body 23.

The details of construction in conjunction with the operation are now given in more detail.

Interlocking Roller System

Figure 4:
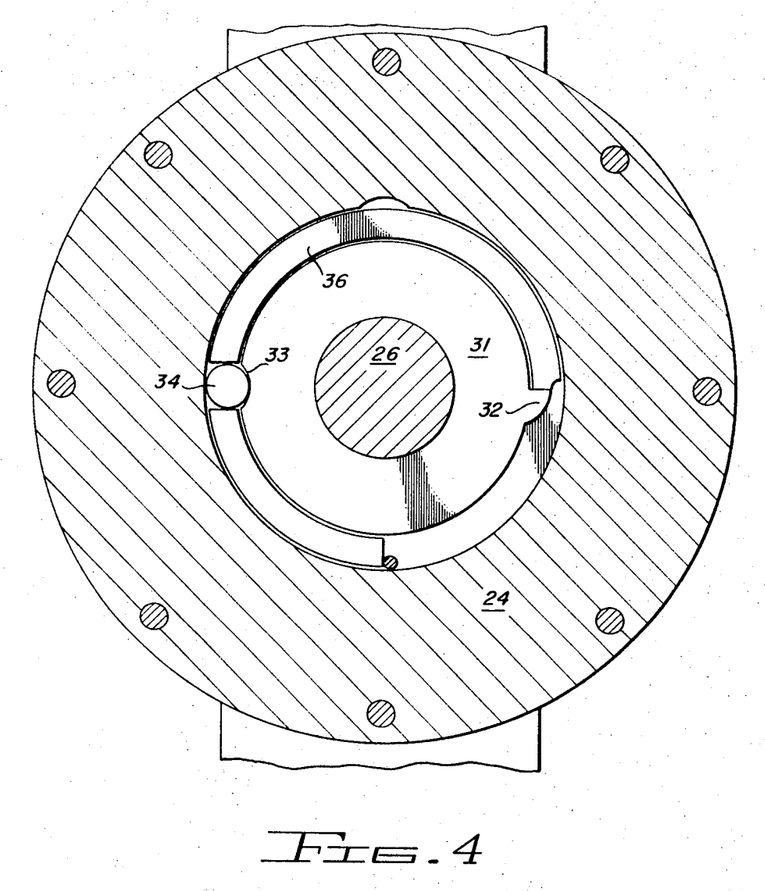
FIG. 4 shows a sectional view taken along the line 4—4 of FIG. 2.
Figures 6, 7:
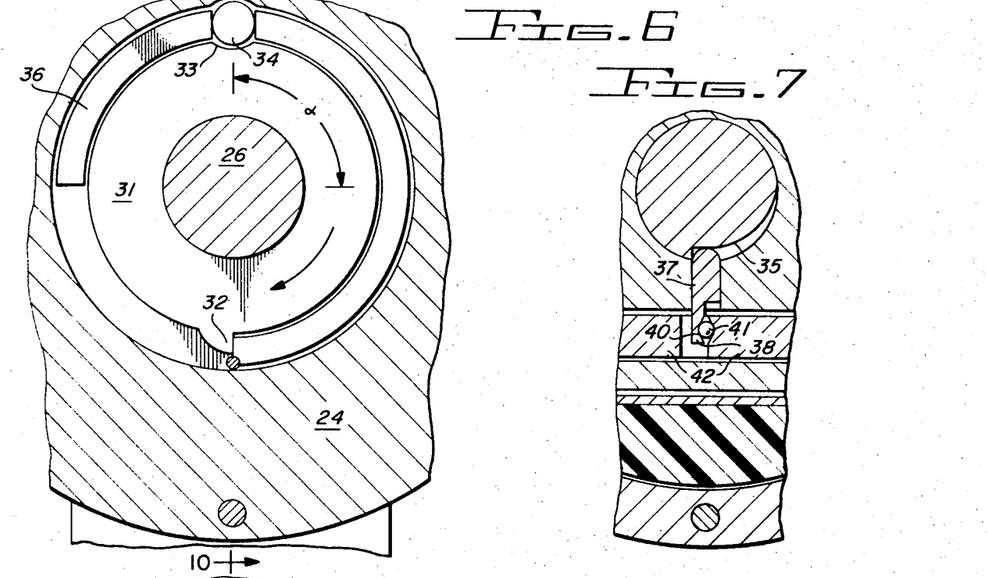
FIG. 6 shows a fragmentary view of the interlocking roller system between the plug and the valve stem when the valve is in the open position.
FIG. 7 shows a fragmentary view of the actuating plunger and roller bearing when the valve is open.
Figure 8:
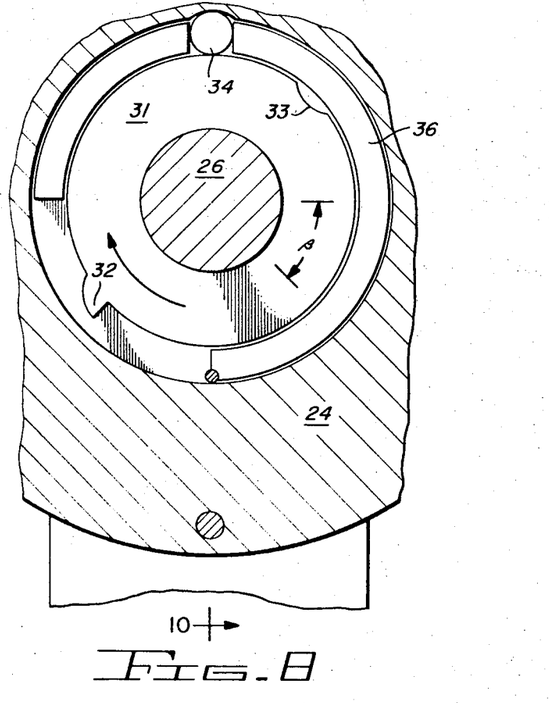
FIG. 8 shows a fragmentary view of the interlocking roller system between the plug and the valve stem when the valve has started to close.
Figure 9:
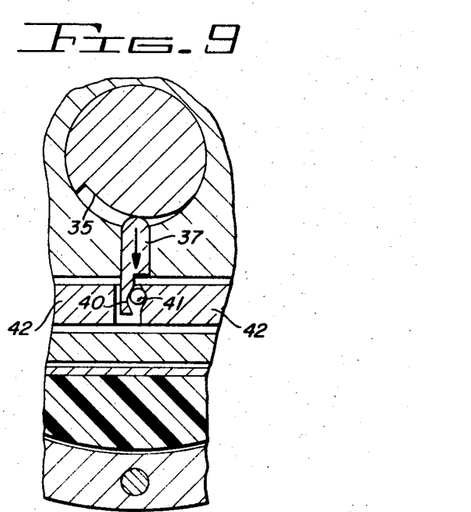
FIG. 9 shows a fragmentary view of the actuating plunger and roller bearing when the valve is starting to close.
Figure 10:
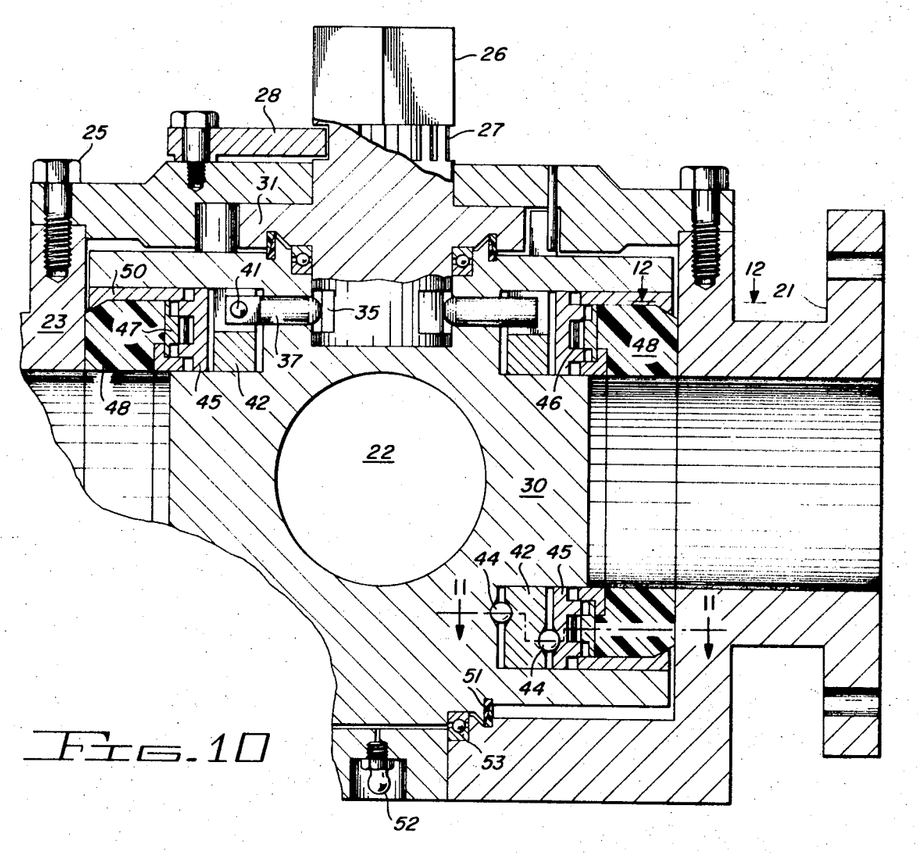
FIG. 10 is a sectional view taken along the line 10—10 of FIG. 8.

Since the rotation of the plug 30 is limited to 90°, and since continued rotation of the stem 26 is needed for perhaps another 75°, to actuate the sealing assembly, it is apparent that a system is needed to engage the stem 26 and plug 30 for 90°, but then have them automatically disengage so the plug 30 stays at the 90° closed position, but the stem 26 continues to turn. This is done with the interlocking roller 34. This roller has a larger outside diameter than the thickness of the protruding ring 36 of the plug 30, in which the roller 34 rides, and as shown in FIG. 4, it ties the shoulder 31 of the stem 26 and plug 30 together for the first 90° of rotation clockwise. At this point plug 30 is in the closed position and as the stem 26 continues turning, roller 34 is forced to flip across into the recess 33 inside the cover plate 24 (FIG. 6). Now stem 26 is free of plug 30 and continues to rotate (FIG. 8). During this continued rotation, the inclined planes of grooves 35 on the bottom of stem 26 is forcing actuating plungers 37 to begin moving the seals. In the opening cycle (counterclockwise), the lug 32 in stem 26 engages the circular shoulder 31 on the plug and as the plug begins to move, interlocking roller 34 is now forced out of its cover plate recess and rides in the stem recess 33.

Camming Balls Action

Figure 11:
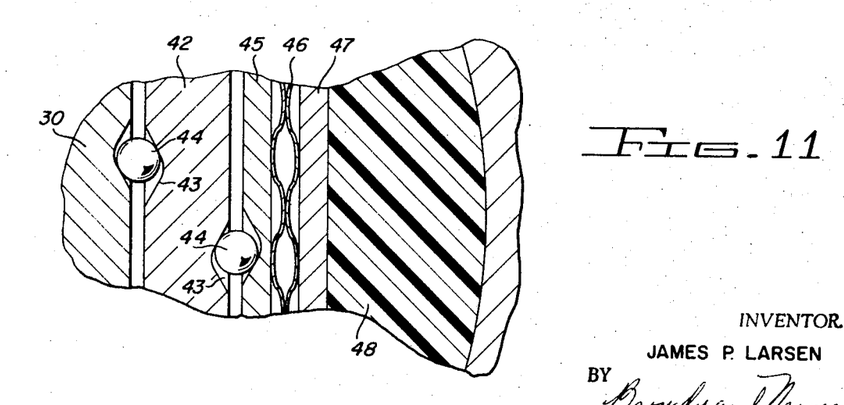
FIG. 11 is a sectional view taken along the line 11—11 of FIG. 10.

If two parallel placed, flat pieces of material, such as camming plates 42, FIG. 11, had drill points or conical indentations put into each, and then a ballbearing such as 44 is placed inside each of those conical points, a sliding movement in any direction would cause the ball to ride up one side of one of the drill points and also cause the ball to ride up the other side of the opposing drill point. The effect is that the two flat pieces would separate. This principle is used both to rotate the camming plate 42, and also to force or drive the U-shaped power seal driver 45.

Stem

As stem 26 turns past 90°, graduated recess or groove 35 in the bottom of the stem forces actuating plunger 37 away from the stem.

Sealing Mechanism

As the stem 26 turns, the actuating plunger 37 is forced to move along groove 34 into a recess in the top of the compression (camming) plate 42. Plunger 37 has a flat side 38 which has a drill point 40 in it. Movement of the plunger 37 away from stem 26 causes the camming plate 42 to rotate slightly and simultaneously to move away from plug 30 slightly, since it is riding on camming balls 41 in the drill points 40. The opposite face of the camming plate 42 also has drill points 43 (FIG. 11) as does the back side of the seal driver 45. Therefore, the driver 45 will have no rotary movement, but only move out or in. Its travel out or in is to be limited to ½ inch (which is controlled by the drill bit angle, but normal drill points of 59 ½° with a ⅜ inch steel ball seems to work fine).

Figure 5:
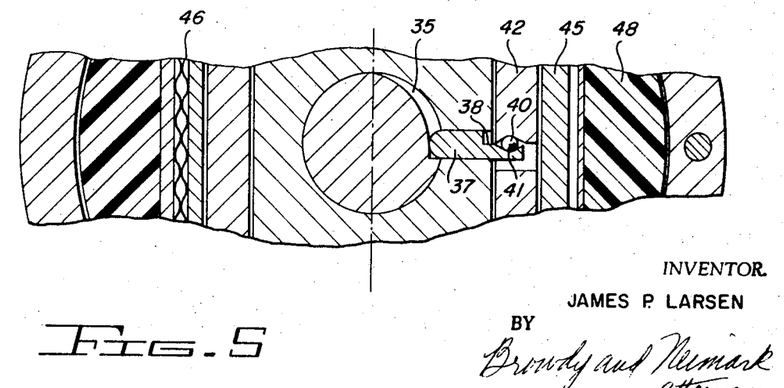
FIG. 5 shows a sectional view taken along the line 5—5 of FIG. 2.

As the driver 45 moves outward, first contact is with the waffle springs 46 (FIGS. 5 and 11) which in turn force against sealing piston 47 which rams the soft seal 48 into the body or side of the valve 23, creating the actual seal. The purpose of the waffle springs 46 is to keep a constant strain on the soft seal 48, acting as a temperature compensator partly and also to absorb some load in the event of overtorqueing, and thus help prevent unnecessary extruding of the soft seal, which is probably made of "Teflon", or the like.

The "Teflon" will be oversized by approximately ¼ inch, or will do all of the sealing until ¼ inch is used up. At this point, and in the event of fire and the "Teflon" melting away, the back edge of the nodular iron backup seals 50 will engage the shoulder of the U-shaped power seal driver 45 and will cause the front ends of these iron backup seals 50 to move against the valve body 23, thereby providing metal-to-metal positive backup sealing. The metal backup seals 50, or retainers, will probably be made of nodular iron, which is softer than steel, thus making the valve fire safe.

Stem Driving and Locking Means

Figure 15:
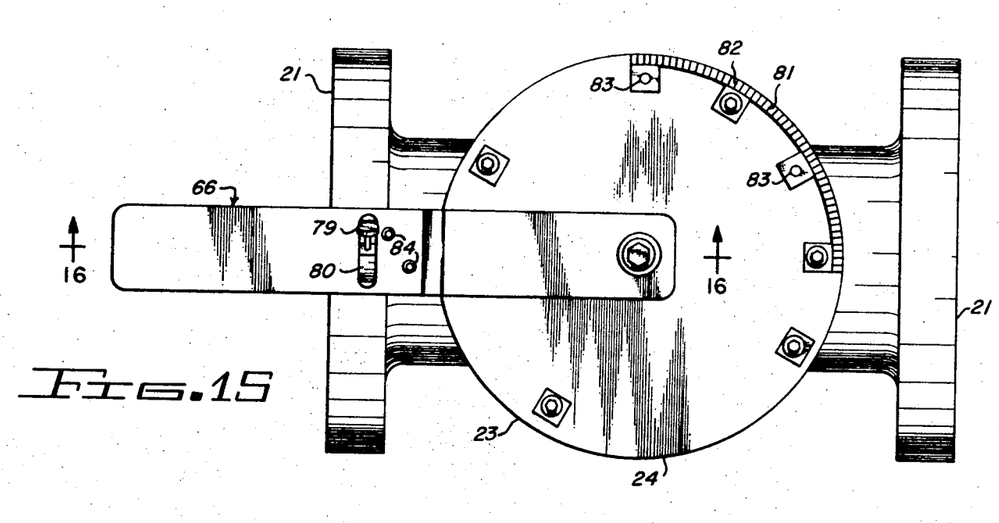
FIG. 15 is a plan view of the valve particularly detailing one handle and locking arrangement interacting with the stem.

In the device as hereinbefore described, the stem 26 may be turned by any expediency such as a common wrench and locked by the simple ratchet and pin arrangement. A more sophisticated stem driving and locking means is disclosed in FIGS. 15–17. An elongate handle 66 is adapted at one end thereof to engage the upper end of the stem 26. As herein shown, a recess 67 fits over the square upper end of the stem 26 and the handle is secured, as by an Allen screw 68, extending through the handle 66 and threadedly engaging the stem 26. The handle 66 could, of course, be secured to the stem 26 in various methods as are well known in the metal-working trade. A cylindrical pin 69 having a wedge-shaped lower end 70 forms a ratchet dog which is slidably disposed within the vertical bore 71 of the handle 66. A coil spring 72 normally exerts downward pressure upon the pin 69. A shaft 73 is rotatably carried within the bore 74. The shaft 73 has a flattened recess portion 76 which engages through a generally rectangular aperture 77 within the pin 69. A stem 78 secured to the shaft 73 and having a knob 79 at the upper end thereof is used to rotate the shaft 73 within the bore 74. The stem 78 passes through a slot 80 in the handle 66 which substantially defines a 90° angular movement of the stem and therefore the shaft 73.

Figure 16:
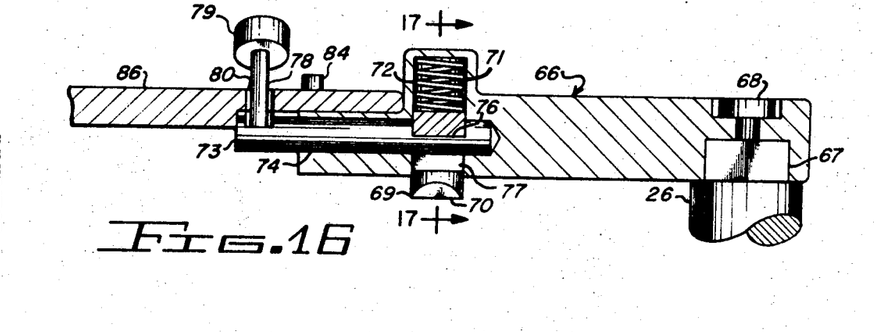
FIG. 16 is a sectional view of the handle taken along the line 16—16 of FIG. 15.
Figure 17:
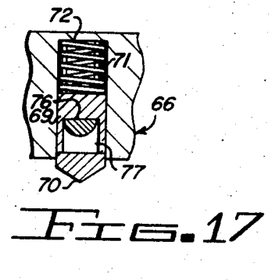
FIG. 17 is a sectional view taken along the line 17—17 of FIG. 16.

In the rest position, as particularly noted in FIGS. 16 and 17, the top of the aperture 77 rests against the flattened portion 76 to permit the wedge-shaped lower end 70 of the ratchet dog to extend below the handle 66. The aperture 77 is sized such that force exerted upwardly on the ratchet dog 69 will permit the dog to retract upwardly against the spring 72 such that the lower end 70 is in substantial alignment with the underside of the handle 66 without the lower portion of the aperture 77 abutting the shaft 76. In this normal rest position, the stem 78 bears against one end of the slot 80. Movement of the stem 78 to the opposite end of the slot 80 rotates the shaft 73 approximately 90° whereby the edge of the flattened recess 76 exerts an upward camming action against the top of the aperture 77 to retract the cylinder 69 upward within the bore 71 and retain the lower end 70 at a position in substantial alignment with the underside of the handle 66. A ratched rack 81 having upstanding teeth 82 is secured by bolts 83 to the cover plate 24 approximately one quadrant of the periphery thereof such that the upstanding teeth 82 are engageable with the ratchet dog 69 when the handle 66 passes thereover. The ratchet rack 81 is positioned in that quadrant of the cover plate 24 over which the handle must pass during the sealing phase of rotation. That is, the dog and the ratchet do not engage during the first 90° of rotation during which time the stem 26 and the plug 30 rotate together. Since the rotation of the plug 30 is limited to 90°, and since continued rotation of the stem 26 is needed for perhaps another 75°, to activate the sealing assembly, it is apparent that the dog and the ratchet may engage at any place after the first 90° and at approximately 75° to lock the plug and seals into closed position. To open the valve, it is simply necessary to rotate the shaft 73 by the knob 79 to disengage the dog 69 from the ratchet 81, thus freeing the handle 66 for rotation. To provide a tamper-proof handle wherein the valve may be in the "shut" position, the stem 78 may be threadedly disengaged from the shaft 73 and the bolts 84 removed, thereby permitting the grip portion 86 to be separated from the handle 66, thus rendering the valve virtually inoperative and foolproof.

Figure 18:
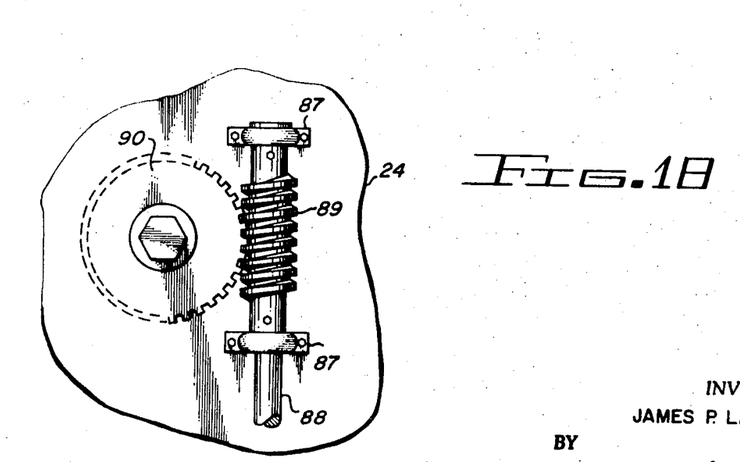
FIG. 18 is a fragmentary plan view displaying an alternate means for rotating the stem.

FIG. 18 displays an alternate arrangement for rotating the stem 26. Pillow blocks 87 secured to the upper surface of the cover plate 24 rotatably support a horizontal shaft 88. A worm gear 89 is affixed to the shaft 88 and rotatable therewith. A worm wheel 90 axially secured to the stem 26 is in driving engagement with the worm gear 89 such that when the shaft 88 is rotated, the stem 26 is concurrently rotated. Although no specific means of rotating the shaft 88 is described herein, it will be apparent to those skilled in the art that the shaft may be rotated by numerous conventional expediencies consistent with the instant application of the valve. For manual operation, the shaft may be fitted with a handle crank at one end thereof or, alternately, in large complex installations the shaft may be motor-driven by hand switching or automatic control as in a computerized system.

From the above description of the structure and operation of the present invention, it is obvious that there is disclosed a valve which provides many improvements and advantages over similar, prior known valves. The invention provides positive and complete sealing against high pressures with a minimum of physical effort, it eliminates friction and wear on the seal due to rotation of the valve plug, and it provides full and automatic metal-to-metal backup of the soft seal in the event of fire or disintegration of the soft seal. Furthermore, it provides easy positive operation in less than 180° of stem rotation, it has a self-releasing of the seal which eliminates sticking even after extended use, and it has a built-in temperature compensator which has the dual function of preventing damage to the soft seal caused by overtorqueing.

It will be obvious to those skilled in the art that various changes may be made without departing from the spirit of the invention and therefore the invention is not limited to what is shown in the drawings and described in the specification, but only as indicated in the appended claims.

I claim:
1. In a valve assembly,
  a. a valve body defining a chamber having aligned inlet and outlet passages for flowing fluid under pressure therethrough;
  b. a plug rotatable in said body having a passage therein which in an open position aligns with said inlet and outlet passages and is rotatable into a position 90° from said open position to a closed position, said plug having a cylindrical recess in one face which is in axial alignment with the axes of rotation of the plug;
  c. a stem rotatable in said body and having an inner end received in the recess in said plug;
  d. means in said plug and stem for establishing a driving relation between said plug and stem for rotation of the stem relative to the body through 90° and discontinuing said driving relation after said 90° of rotation;
  e. an activating plunger mounted for radial movement in said plug and movable radially by said stem as an incident of rotation of said stem relative to said plug;
  f. a camming fall engaging said plunger at its radially outer end, and
  g. a seal about the inner end of one of said outlet and inlet passages and engaging the valve body under pressure from said camming ball and activating plunger as said stem is rotated relative to the plug.

2. The valve of claim 1 wherein the body structure includes an aperture for the passage of the stem, and ratchet means in the body structure for locking the stem against rotation.

3. The valve of claim 2 wherein the means for disconnecting the stem from the plug includes:
   a. a protruding semi-circular ring on top of the plug;
   b. a recess located in the ring;
   c. an interlocking roller positioned in the recess; and
   d. a lug projecting out from the stem for contacting the ring during a portion of the rotation of the stem.

4. The valve of claim 3 further including a curved groove, spiraling around the lower end of the stem, the bottom of the groove being cut in an inclined plate.

5. The valve of claim 4 wherein the activating plunger has one end riding in the curved groove so that the plunger moves away from the stem when the stem rotates.

6. The valve of claim 5 wherein the camming ball is located in an indentation on the other end of the plunger.

7. The valve of claim 6 wherein the means driven by the plunger includes:
   a. a compression plate reciprocated by the camming ball;
   b. a power seal driver next to the compression plate;
   c. a plurality of additional camming balls between the compression plate and the power seal driver, so that movement of the compression plate is transmitted to the power seal driver by means of the camming balls;
   d. a sealing piston driven by the power seal driver; and
   e. a soft seal driven by the sealing piston so that it rams against the body structure to stop fluid flow through the chamber.

8. The valve of claim 7 further including waffle springs between the power seal driver and the sealing piston to provide temperature compensation and prevent overtorqueing of the stem.

9. The valve of claim 8 further including iron backup seals activated by the power seal driver if the soft seal is destroyed, to move these iron seals against the valve body, thereby providing metal-to-metal backup sealing.

10. The valve of claim 9 further including a pressure system for lubricating the trunnion bearing.

11. The valve of claim 7 further including cam means interacting between said sealing piston and said body structure to retract said sealing piston into said plug away from said body structure and carrying said soft seal away from said body structure during initial movement of said plug after said stem is connected to said plug during opening of said valve.

12. The valve of claim 11 wherein said cam means includes:
   a. a horizontally disposed wedge carried by the interior wall of said body structure and having the apex thereof extending radially inward therefrom; and
   b. a wedge-shaped indentation within the face of said sealing piston,
said wedge and said wedge-shaped indentation achieving substantial alignment after said plug has been rotated 90° and wherein said indentation is engageable over said wedge after said stem has been disconnected from said plug, permitting said soft seal to ram against said body structure.

13. The valve of claim 1 including power transmission means for rotating said stem.

14. The valve of claim 13 wherein said power transmission means includes:
   a. a worm wheel axially secured to said stem;
   b. a horizontal shaft disposed for longitudinal rotation carried upon the top of said body structure; and
   c. a worm gear carried by said shaft and rotatable therewith in driving engagement with said worm wheel.

15. The valve of claim 2 wherein said ratchet means for locking the stem against rotation includes:
   a. a substantially horizontal elongate handle having one end thereof secured proximate the upper end of said stem;
   b. a ratchet dog carried by said handle and disposed for vertical sliding movement therewithin;
   c. spring biasing means normally urging said dog downward;
   d. a ratchet track carried on the upper surface of said body structure having ratchet teeth therein engageable with the lower end of said ratchet dog to retain said handle at a predisposed position; and
   e. means for selectively compressing said biasing means and retaining said ratchet dog away from the teeth of said ratchet track.

* * * * *